United States Patent [19]

Inoue et al.

[11] Patent Number: 5,305,166
[45] Date of Patent: Apr. 19, 1994

[54] MAGNETIC HEAD SLIDER

[75] Inventors: Atsushi Inoue, Yao; Fumio Kameoka, Daito; Hiroyasu Egashira, Shijonawate; Satoru Ota, Hirakata; Yoshifumi Fukumoto, Daito; Masanori Hongo, Shijonawate, all of Japan

[73] Assignee: Sanyo Electric Co., Ltd., Osaka, Japan

[21] Appl. No.: 968,891

[22] Filed: Oct. 30, 1992

[30] Foreign Application Priority Data

Oct. 31, 1991 [JP] Japan .................. 3-286003
Oct. 9, 1992 [JP] Japan .................. 4-271263

[51] Int. Cl.⁵ .................................. G11B 5/60
[52] U.S. Cl. .................................. 360/103
[58] Field of Search .................. 360/103; 29/603

[56] References Cited

U.S. PATENT DOCUMENTS 4,821,131  4/1989  Gotoh ................. 360/103
5,072,322  12/1991  Yasar et al. ........... 360/103
5,136,444  8/1992  Maki et al. ........... 360/103
5,184,393  2/1993  Saito et al. ........... 29/603

Primary Examiner—Robert S. Tupper
Attorney, Agent, or Firm—Nikaido, Marmelstein, Murray & Oram

[57] ABSTRACT

A slider body and a yoke each made of a ferromagnetic oxide are butted against each other with a gap spacer provided therebetween. An air bearing portion is formed on the upper surface of the slider body. The yoke has a width t smaller than the width w of the air bearing portion, and is covered over both side faces thereof with glass and bonded to the slider body with the glass.

5 Claims, 9 Drawing Sheets

MAGNETIC HEAD SLIDER

FIELD OF INDUSTRIAL APPLICATION

The present invention relates to magnetic head sliders adapted for use in hard disc drive devices and comprising a slider body of ferromagnetic oxide serving as one half of a magnetic core and a ferromagnetic oxide yoke serving as the other half of the core for providing a winding thereon, the yoke butting against the body and being bonded thereto with a nonmagnetic gap spacer interposed therebetween. The invention relates also to a process for producing such sliders.

BACKGROUND OF THE INVENTION

FIG. 16 shows such a head slider 14, which comprises a flat slider body 2 of ferromagnetic oxide, and a winding portion 3 including yokes 36, 36 made of ferromagnetic oxide and joined to one end of the body with glass. The slider is provided, on the surface thereof to be opposed to recording media, with air bearing portions 5, 5 extending in the direction of movement of the medium in parallel to each other and having a predetermined height. The junction of the body and the yoke is formed with a track portion 6 including a gap spacer 64 and with a winding groove 4.

With the magnetic head slider described, the winding yoke 36 has a width t which is approximately equal to the width w of the air bearing portion 5. Since the width w of the air bearing 5 is about 400 μm, the width t of the yoke, i.e., the width of the ferromagnetic portion forming the yoke, is excessively large to increase the inductance of the magnetic head.

To give improved high-frequency characteristics to ensure a higher recording density, it is required to minimize the inductance, whereas the conventional shape of the yoke fails to meet this requirement.

Sliders have been proposed in which the width t of the yoke 36 is smaller than the width w of the air bearings 5, 5 (U.S. Pat. No. 5,012,572).

Nevertheless, when the width t of the yoke 36 is to be made smaller than the width w of the air bearing 5, the width t of the yoke is limited to about 200 μm if smallest in view of the strength of the yoke 36. Widths smaller than this limit lead to impaired strength, which poses the problem that a break or crack is liable to develop in the yoke and the junction of the yoke and the slider body during production to result in a markedly reduced yield.

The magnetic head slider 14 is prepared by heating the slider body 2 and the winding yoke 36 as butted against each other under pressure and melting glass to join the yoke to the body. This step involves the problems that the glass 33 flows into the winding groove 4 to narrow the opening thereof, consequently presenting difficulty in winding a conductor on the head slider 14 as completed.

SUMMARY OF THE INVENTION

An object of the present invention is to provide a magnetic head slider comprising a yoke of ferromagnetic oxide which is covered with a nonmagnetic material over one side face or both side faces thereof and which is thereby given a sufficient mechanical strength and a reduced inductance to ensure a higher recording density, and to provide a process for producing the slider.

Another object of the present invention is to provide a magnetic head slider having a winding groove which is prevented from becoming filled with glass so that a winding can be formed on the slider with ease, and to provide a process for producing the slider.

Still another object of the present invention is to provide a magnetic head slider including a yoke which is reduced in inductance and which is nevertheless diminished in the resulting decrease in the output so as to give an improved reproduction-recording efficiency to the slider.

DESCRIPTION OF THE PREFERRED EMBODIMENTS

Figure 2:
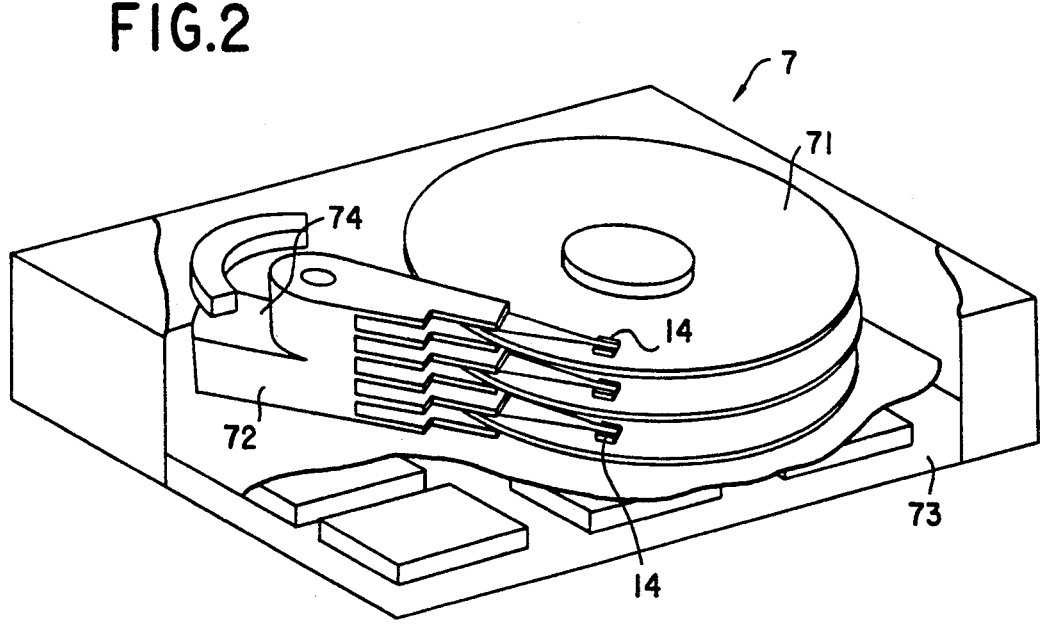
FIG. 2 is a perspective view of a hard disc drive device having magnetic head sliders.

As shown in FIG. 2, a hard disc drive device 7 has rotatably supported on its device body 73 a plurality of hard discs 71 as arranged side by side and driven at a high speed by a rotating mechanism (not shown).

The device body 73 is provided with a head support mechanism 72 carrying on arm ends magnetic head sliders 14 for the respective hard discs 71, and with a control circuit for driving a positioning mechanism, which holds each slider substantially at rest on the track of the disc. The magnetic head slider 14 is raised off the hard disc 71 (about 30 to about 70 nm above the disc) by air pressure due to the high-speed rotation of the hard disc 71 to record signals on the disc 71 or reproduce signals therefrom.

Figure 1:
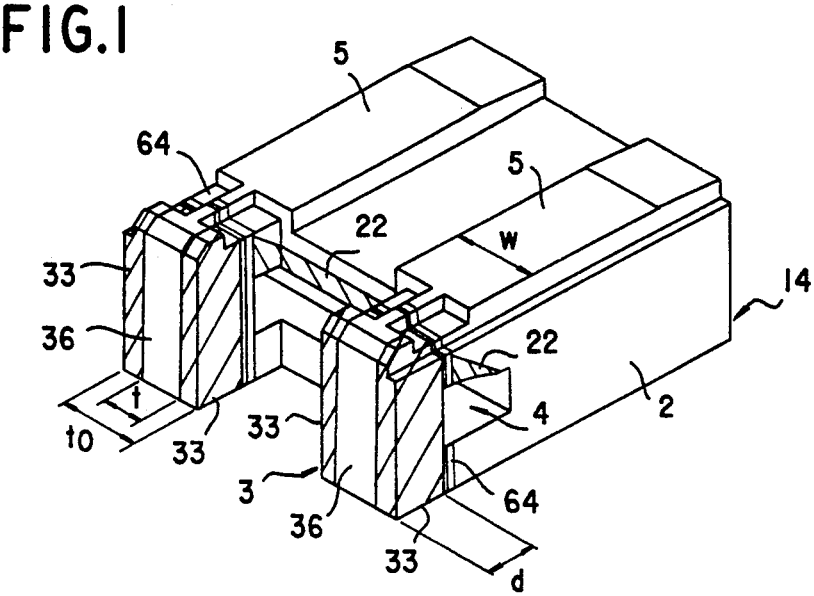
FIG. 1 is a perspective view of a slider embodying the invention.

FIG. 1 shows the construction of the magnetic head slider 14. The slider 14 comprises a slider body 2 made of a ferromagnetic oxide and having air bearing portions 5, and winding yokes 36 made of a ferromagnetic oxide and bonded to the slider body. A winding groove 4 is formed at the junction of the slider body 2 and the yokes 36 to extend through the slider. The yokes 36 have a width t smaller than the width w of the air bearing portions 5. The yokes 36 are covered with glass 33 over one side face or both side faces thereof to provide winding portions 3. The yokes 36 are bonded to the slider body 2 with the glass 33 at yoke-side and glass 22 in the gap depth regulating groove 41.

Figure 3:
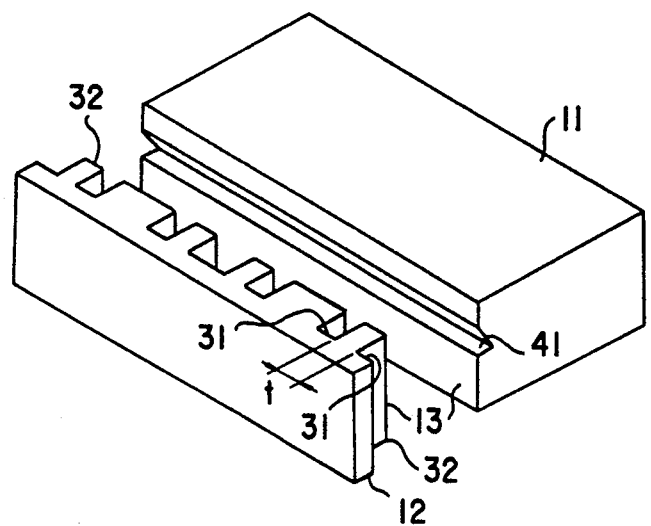
FIG. 3 to FIG. 8 are perspective views for illustrating a process for producing the magnetic head slider of the invention.

The magnetic head slider 14 of the present invention is produced by the process illustrated in FIGS. 3 to 8. With reference to FIG. 3, a gap depth regulating groove 41 is formed by cutting with a diamond abrasive wheel or the like in a butt face 13 of a large substrate 11 made of a ferromagnetic oxide such as Mn-Zn single-crystal ferrite. A small substrate 12 has groovelike cutouts 31 which are formed in a butt face 13 thereof, with an uncut portion left therebetween over a width t smaller than the finished width $t_0$ of the winding portion 3 to be described later. The cutouts 31 are orthogonal to the gap depth regulating groove 41 and have a depth greater than the thickness of the yoke 36 to be finally obtained. The width t of a ridge 32 thus left between the cutouts 31, 31 is determined in accordance with the inductance required of the yoke 36 to be formed later.

Figure 4:
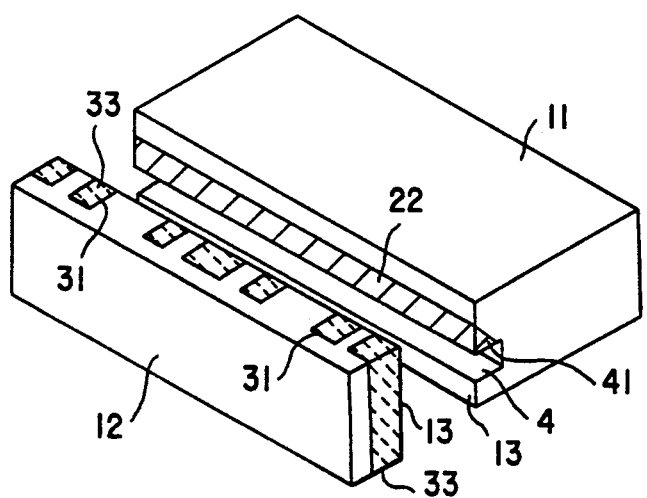

As shown in FIG. 4, glass is filled into the groovelike cutouts 31 of the small substrate 12 and the gap depth regulating groove 41 of the large substrate 11 as indicated at 33 and 22, respectively.

Figure 5:
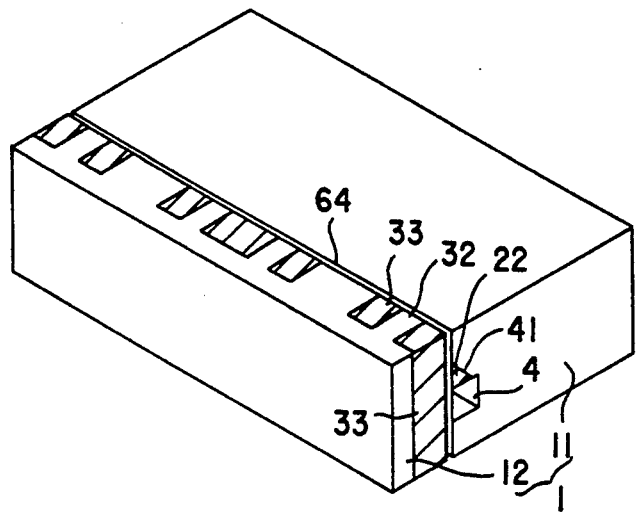

The butt faces of the two substrates 11, 12 are polished to mirror finish, and a nonmagnetic thin film of $SiO_2$ is formed over the butt face of each or one of the substrates 11, 12 to a total thickness of 0.3 μm by sputtering to form a gap spacer 64. The two substrates 11, 12 are then butted against each other as shown in FIG. 5 and heated to melt the glass portions 33, 22, whereby the gap spacer film 64 formed on the glass surface is embedded into the melt of the glass and the substrates 11, 12 are bonded together into a wafer 1 of bonded substrate.

Figure 6:
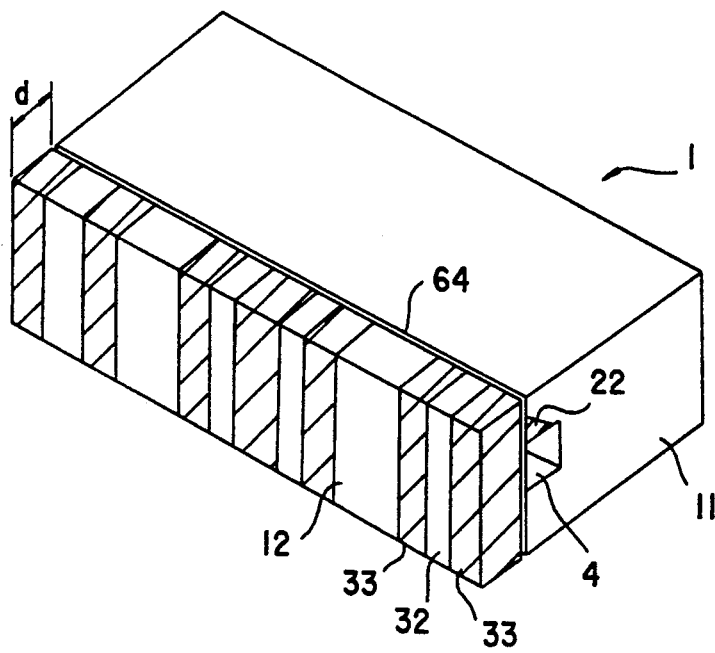

Next as shown in FIG. 6, the front side of the small substrate 12 of the wafer 1 is cut off to give the remaining portion of the substrate 12 a predetermined thickness d of yokes 36 and expose the glass 33.

Figure 7:
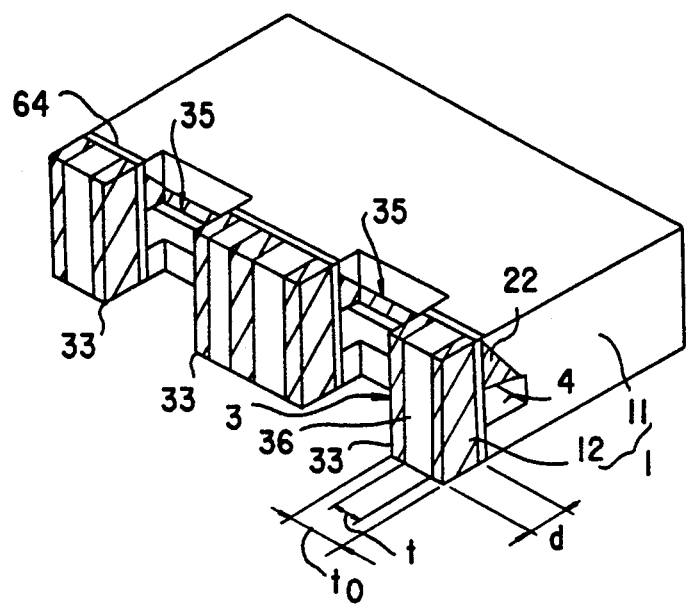

With reference to FIG. 7, cutouts 35, 35 extending vertically through the wafer 1 are subsequently formed in the front side thereof including the small substrate 12 to form winding portions 3 each including the yoke 36 and having a width $t_0$.

Figure 8:
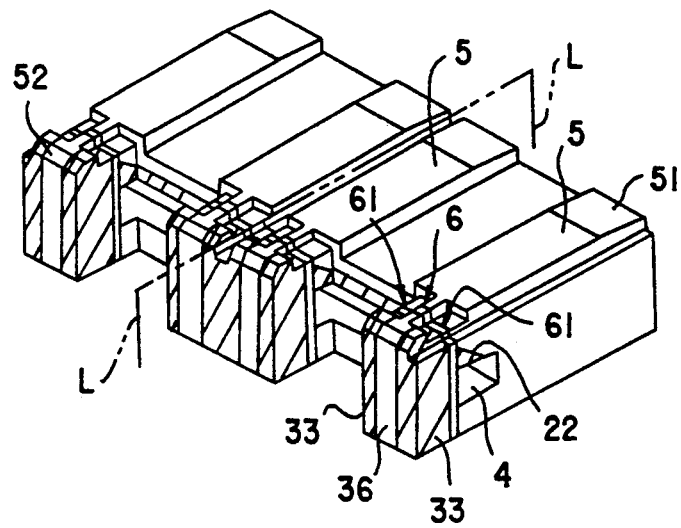

As shown in FIG. 8, the wafer 1 is further ground at air inlet ends 51 of air bearings 5, 5 and air outlet ends 52 to form slopes. A resist pattern is formed by photolithography on each of the wafer portions to be made into track portions 6, and opposite side of the track portion 6 are cut out as by ion milling to form recesses 61, whereby the track portion 6 is given a predetermined track width.

The wafer 1 is sliced into slider units as indicated by a dot-and-dash line L as shown in FIG. 8 to obtain head sliders as shown in FIG. 1.

With the magnetic head slider prepared by the above process, opposite side faces of the yoke 36 are covered with the glass 33 to increase the width $t_0$ of the winding portion 3, whereas the width t of the yoke itself can be made small. This decreases the width of ferromagnetic oxide portion included in the winding portion 3 to result in a reduced inductance to ensure a higher recording density. The glass 33 on the side faces of the yoke is fused to the slider body 2 and therefore imparts an enhanced strength to the bond between the yoke 36 and the slider body 2. The glass covering the side faces of the yoke also assures the yoke of a sufficient mechanical strength.

In practicing the present invention, the yoke 36 may be covered with the glass 33 only over the inner or outer side face of the yoke to form the winding portion 3. In this case, the yoke itself can also be small in width t, resulting in a decreased inductance for recording with a higher density, while the glass 33 reinforces one side face of the yoke to prevent the yoke from damage or breakage.

The winding groove 4 and the gap depth regulating groove 41 can alternatively be formed with the small substrate 12, with these grooves omitted from the large substrate 11, or can be formed in both of the large and small substrates 11, 12.

Furthermore, before the large and small substrates 11, 12 are bonded together, a thin film of ferromagnetic metal, such as sendust, can be formed over the butt face of one or each of these substrates as by sputtering. The two substrates are then bonded together with the gap spacer 64 provided therebetween, whereby a so-called MIG head slider can be formed which is high in recording density and has the thin film of ferromagnetic metal on one or each side of the gap portion.

Although the winding portion 3 is provided at each of the air outlet ends adjacent to the two air bearings 5, 5, the winding portion 3 can of course be formed only at one of the air outlet ends.

SECOND EMBODIMENT

Figure 11:
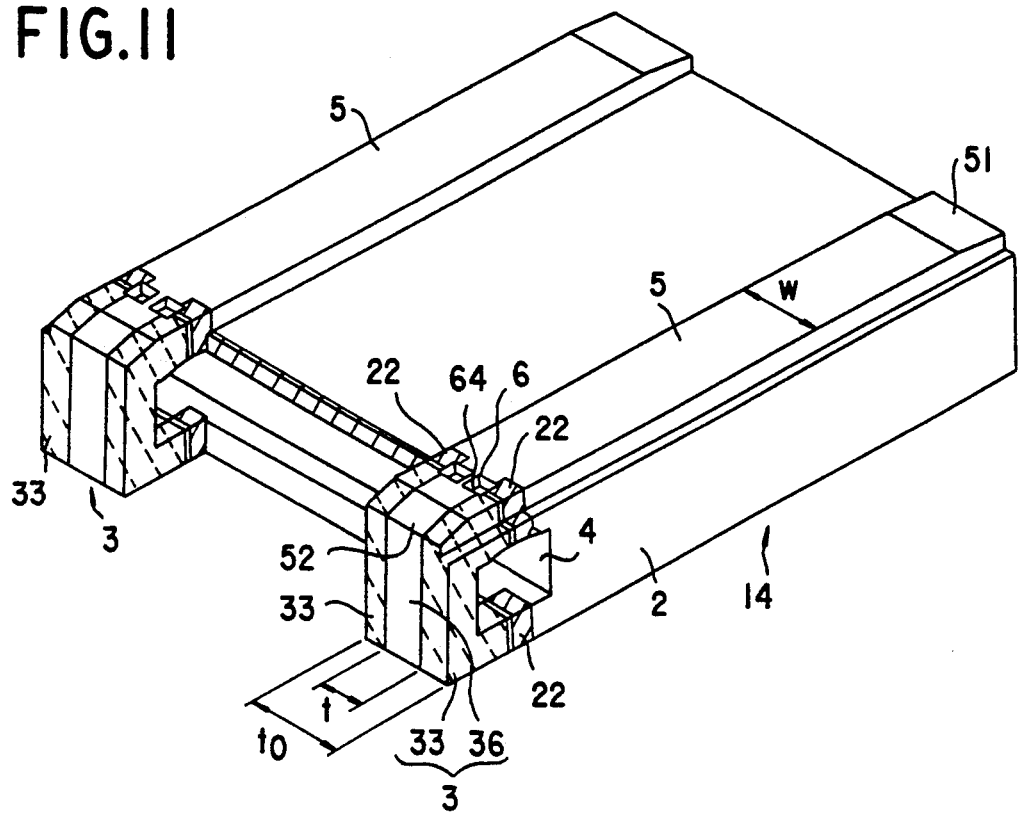

FIG. 11 shows a magnetic head slider 14 of second embodiment of the present invention, wherein each yoke 36 is covered, over both side faces thereof, with a first glass 33 having a high softening point, and a slider body 2 and winding portion 3 are bonded together with a second glass 22 having a low softening point by melting the glass 22.

Figure 9:
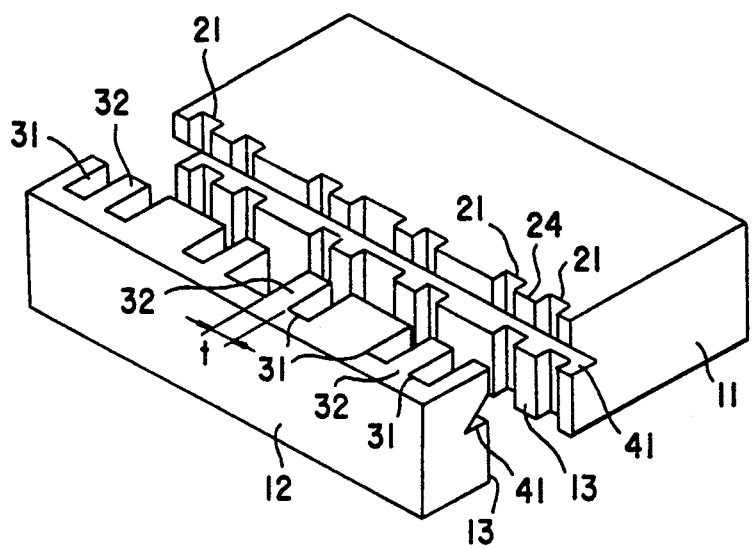
FIG. 9 to FIG. 11 relate to another magnetic head slider as a second embodiment, FIGS. 9 and 10 being perspective views for illustrating a production process, FIG. 11 being a perspective view of the magnetic slider of the second embodiment.

The magnetic head slider 14 is prepared by the following process. With reference to FIG. 9, the small substrate 12 is formed with groovelike cutouts 31 and ridges 32 as in the first embodiment, with a gap depth regulating groove 41 further formed therein. The butt face 13 of the large substrate 11 is formed with bonding groovelike cutouts 21 to be opposed to the respective groovelike cutouts 31 in the small substrate 12 and having the same width as the cutouts 31 and a slightly smaller depth.

Figure 10:
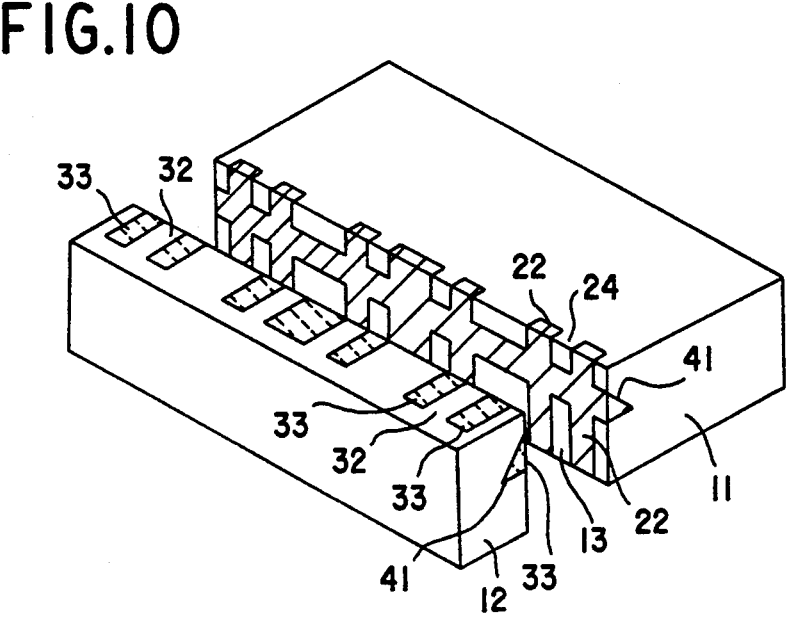

Next with reference to FIG. 10, the first glass 33 having a high softening point is filled into the cutouts 31 and the gap depth regulating groove 41 of the small substrate 12, while the second glass 22 having a low softening point is filled into the cutouts 21 and gap width regulating groove 41 of the large substrate 11.

With reference to FIG. 11, the first glass 33 is a high softening point glass for reinforcing the yokes 36 of the magnetic head slider 14. The second glass 22 is a low softening point glass which is present at the junction of the slider body 2 and the winding portions 3 as shown in FIG. 11 for bonding. The table given below shows the composition and characteristics of these glass materials. In the table, the coefficient of linear thermal expansion is an average coefficient of linear thermal expansion between room temperature and 300° C., the softening point is a temperature at which the glass exhibits a viscosity of $10^{7.65}$ poises, and the filling temperature is the highest hysteresis temperature in the glass filling step of the present process.

As the first glass 33 and the second glass 22 in FIG. 11, the glass A and the glass B respectively in the table are used.

It is possible to use the glass A and glass C respectively in the table as the first glass 33 and the second glass 22 in FIG. 11.

It is also possible to use the glass B and glass C respectively in the table as the first glass 33 and the second glass 22 in FIG. 11.

TABLE

| Name of Glass | Composition (wt %) | | | | | | | Thermal Expansion (1/°C.) | Softening Point (°C.) | Filling Temp. (°C.) |
|---|---|---|---|---|---|---|---|---|---|---|
| | PbO | SiO$_2$ | K$_2$O | Na$_2$O | ZnO | Fe$_2$O$_3$ | B$_2$O$_3$ | | | |
| A | 8.8 | 42.9 | 3.1 | 6.3 | 5.1 | 4.0 | 0.0 | 102 × 10$^{-7}$ | 577 | 615 |
| B | 58 | 35 | 9 | 0 | 0 | 0 | 0 | 102 × 10$^{-7}$ | 525 | 550 |
| C | 72 | 14 | 0 | 1 | 0 | 2 | 11 | 98 × 10$^{-7}$ | 455 | 480 |

The process is subsequently practiced in the same manner as for the first embodiment, whereby the magnetic head slider 14 of FIG. 11 is prepared.

With the magnetic head slider 14 described, the slider body 2 and the winding yokes 36 have two kinds of glasses 22, 33 which are different in softening point. The second glass 22 is lower than the first glass 33 in softening point, so that when the assembly of the slider body and the winding yokes as butted thereagainst is heated, the body and yokes can be bonded together with the second glass 22 which is softened without softening the first glass 33 which is opposed to the winding groove 4 over a wide area. Consequently, no portion of the first glass 33 flows into the winding groove 4 of the slider 14, permitting the groove 4 to remain open without blocking or constriction and facilitating provision of a winding on each winding portion 3.

THIRD EMBODIMENT

Figure 12:
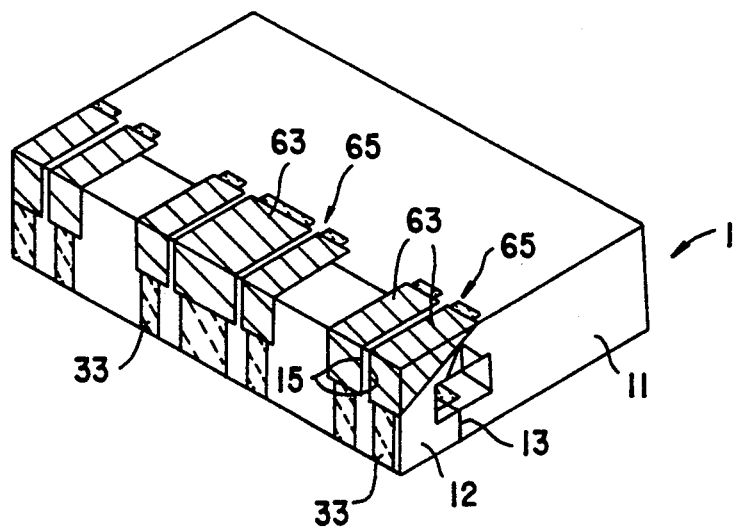
FIG. 12 is a perspective view for illustrating a process for producing a magnetic head slider as a third embodiment.
Figure 13:
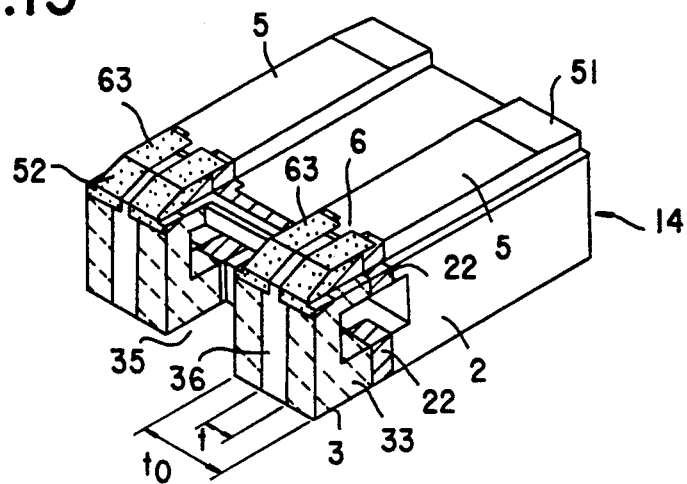
FIG. 13 is a perspective view of the same magnetic head slider.

FIG. 13 shows a magnetic head slider 14 of third embodiment of the invention, which is prepared in the manner illustrated in FIG. 12. The wafer of bonded structure according to the second embodiment is formed with slanting grooves 15, 15 in each ridge 32, with a portion thereof left uncut to provide a projection 65 having small width corresponding to the track width. A third glass 63 having a lower softening point than the second glass 22 is filled into the slanting grooves 15, whereby the glass A in the foregoing table is used as the first glass 33, the glass B as the second glass 22 and the glass C as the third glass 63. The air inlet ends 51 of the air bearings 5, 5, and the air outlet ends 52 are ground to form slopes, and the wafer 1 is thereafter sliced into slider units to obtain head sliders.

In the case of the magnetic head slider thus prepared and shown in FIG. 13 as is the case with the foregoing embodiments, the winding portion 3 has a large width $t_o$, and the yoke 36 is covered with the glass 33. This construction gives an enhanced strength to the bond between the slider body 12 and the yoke 36, further assuring the yoke of a sufficient mechanical strength. The yoke itself has a small width t, which results in a reduced inductance for recording with a higher density.

FOURTH EMBODIMENT

Figure 14:
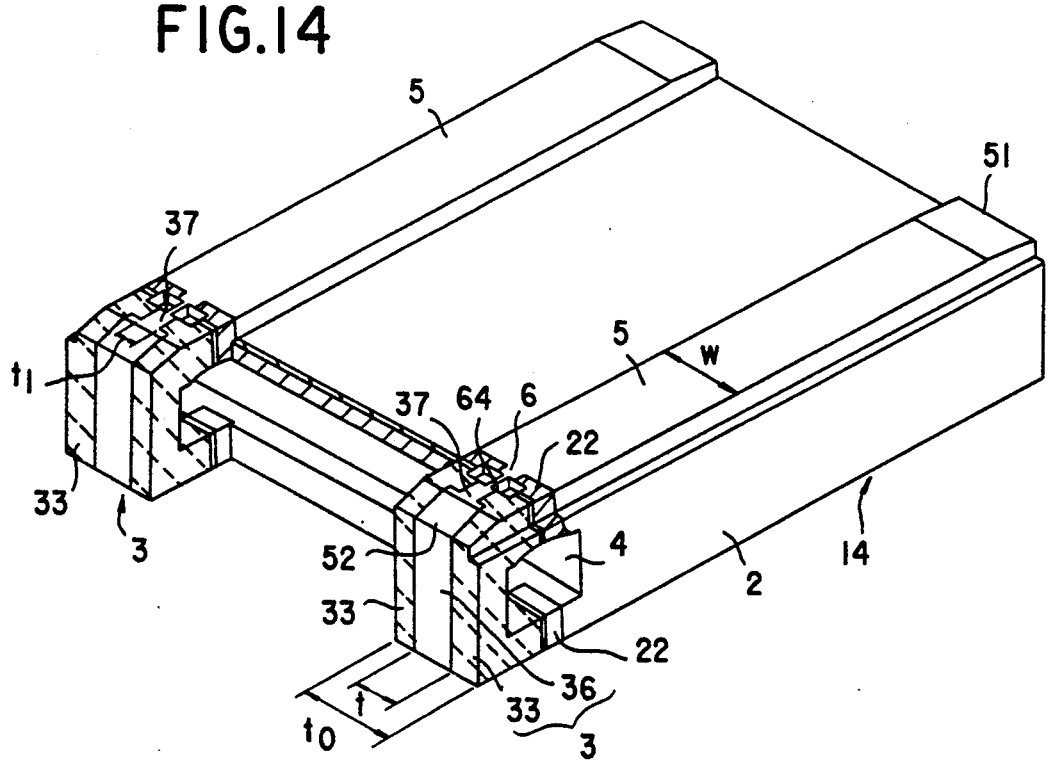
FIG. 14 is a perspective view of another magnetic head slider as a fourth embodiment.

FIG. 14 shows another embodiment of the present invention. According to this embodiment, the magnetic head solider 14 shown in FIG. 11 is further provided with a small projection 37 formed on the butt face of the yoke 36, positioned close to the track portion 6 and having a small width $t_1$.

With the magnetic head sliders of FIGS. 1 and 11, the reduced width t of the yoke 36 makes it possible to realize a reduced inductance and improved high-frequency characteristics, whereas the output tends to decrease with a reduction in the width t of the yoke. Since the output markedly decreases when the yoke width t becomes smaller than a certain limit, there is a limitation to the reduction of inductance by decreasing the yoke width t.

However, the small projection 37 having a reduced width and positioned only in the vicinity of the track portion achieves an improved efficiency only with a small decrease in the output despite a reduction in the inductance of the yoke.

Figure 15:
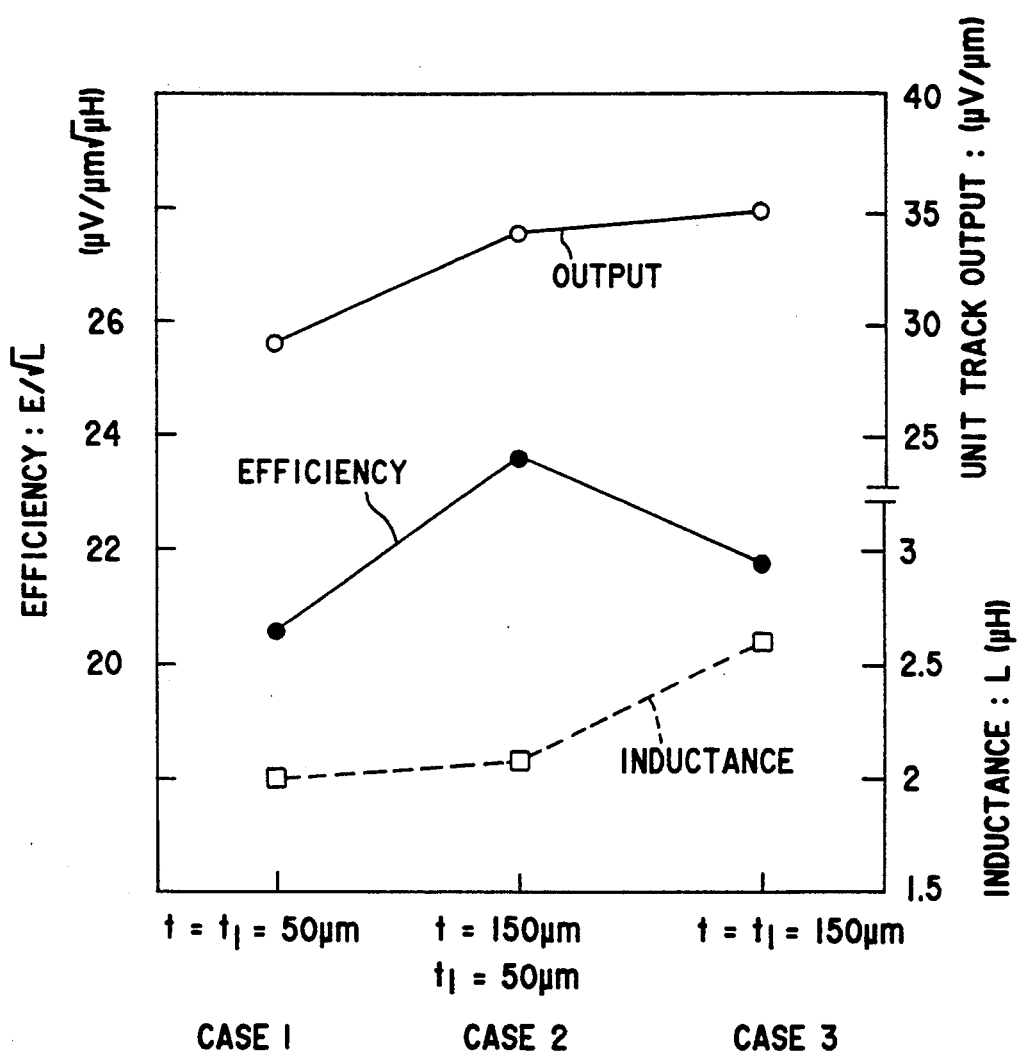
FIG. 15 is a graph showing the inductance, output and efficiency of the same magnetic head slider in comparison with those of other magnetic head sliders.
Figure 16:
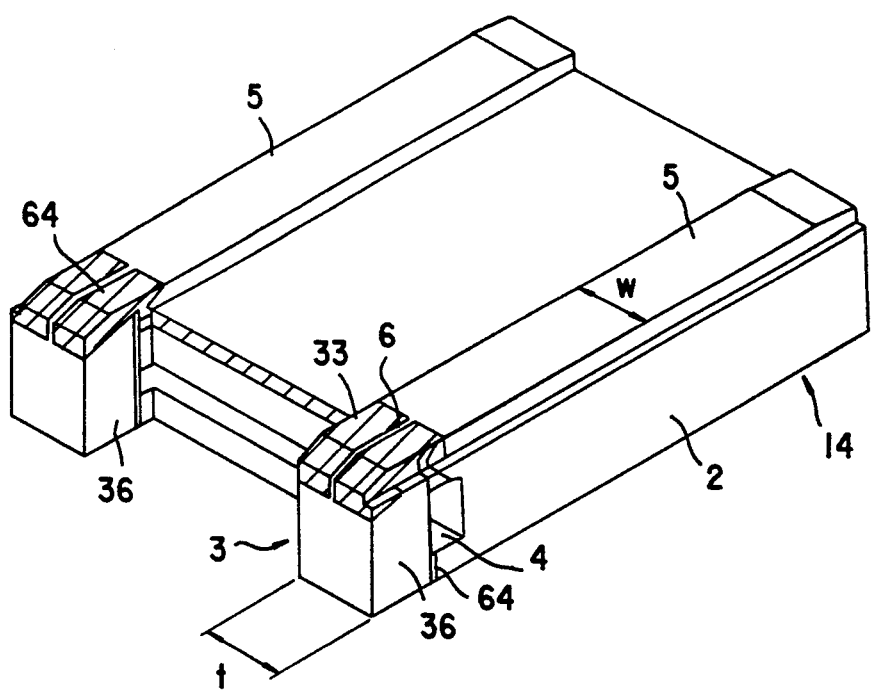
FIG. 16 is a perspective view of a conventional magnetic head slider.

FIG. 15 shows a comparison between the above magnetic head slider and other magnetic head sliders with respect to the output per unit track width: $E(\mu V/\mu m)$, inductance: $L(\mu h)$ and efficiency: $E/\sqrt{L}$. More specifically, three cases are compared wherein the yoke width t and the width $t_1$ of the small projection are the same and small, i.e., 50 $\mu m$ (case 1), t is large and 150 $\mu m$ and $t_1$ is small and 50 $\mu m$ (case 2), and t and $t_1$ are both large and 150 $\mu m$ (case 3).

In the above-mentioned cases 1, 2 and 3, the structure of other portion of the respective magnetic head slider is the same having the structure of MIG (Metal In Gap) type, track width 7 $\mu m$, gap length 0.3 $\mu m$ and the gap depth 2 $\mu m$.

The measuring conditions were: frequency 5.6 MHz, speed of slider relative to hard disc 6.3 m/sec, coercive force of hard disc 1500 oersted, recording current 16 $mA_{b-p}$, and number of turns of winding 35.

The illustrated experimental result indicates that when the overall yoke width is reduced from 150 $\mu m$ to 50 $\mu m$ (case 3→case 1), the inductance reduces by about 23%, and the output also decreases by about 17%, consequently entailing a 5% reduction in efficiency.

On the other hand, when the small projection 37 with $t_1$ of 50 $\mu m$ is provided only in the vicinity of the track portion, with the yoke width t remaining unchanged (case 3→case 2), the decrease in the output is slight to result in about 8% increase in the efficiency.

The foregoing description of embodiments has been given for illustrating the present invention and should not be construed as limiting the present invention as defined in the appended claims or reducing the scope thereof. The components of the device of the invention are not limited to those of the above embodiments in construction but can of course be modified variously within the technical scope defined in the claims.

What is claimed is:

1. A magnetic head slider of the floating type comprising a slider body made of a ferromagnetic oxide and having an air bearing portion, and a winding portion made of a ferromagnetic oxide and bonded to the slider body with a gap spacer provided therebetween, the winding portion including a winding yoke, a winding groove being formed at the junction between the slider body and the winding yoke, a track portion being formed in an upper surface of the slider and including a gap spacer bonded portion, the yoke being smaller than the air bearing portion in width and being covered over one side face or both side faces thereof with a nonmagnetic material bonded to the yoke and the slider body.

2. A magnetic head slider as defined in claim 1 wherein a ferromagnetic metal thin film is formed over one surface or both surfaces of the gap spacer, the magnetic head slider having a MIG structure.

3. A magnetic head slider as defined in claim 1 wherein the yoke is covered over one side face or both side faces thereof with a first glass having a high softening point, and the winding portion and the slider body are bonded together with a second glass having low softening point and filling groovelike cutouts formed in a butt face of the slider body by melting the second glass.

4. A magnetic head slider as defined in claim 3 wherein the yoke has a pair of slanting grooves formed in an upper surface thereof and extending to the track portion to provide between the slanting grooves a small projection having a width equal to a track width, the slanting grooves being filled with a third glass having a lower softening point than the second glass.

5. A magnetic head slider as defined in claim 1 wherein the winding yoke has a small projection of small width formed on a butt face thereof and including the vicinity of the track portion, and the nonmagnetic material covers one side face or both side faces of each of the small projection and the yoke.

* * * * *